US012717584B2

(12) United States Patent
Chaturvedi et al.

(10) Patent No.: US 12,717,584 B2
(45) Date of Patent: Aug. 25, 2026

(54) LIGHTWEIGHT OUT OF ORDER SCHEDULER FOR PROCESSING UNITS

(71) Applicant: The Trustees of Princeton University, Princeton, NJ (US)

(72) Inventors: Ishita Chaturvedi, Princeton, NJ (US); Bhargav Reddy Godala, Priinceton, NJ (US); David I. August, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 18/950,479

(22) Filed: Nov. 18, 2024

(65) Prior Publication Data

US 2025/0165257 A1 May 22, 2025

Related U.S. Application Data

(60) Provisional application No. 63/599,760, filed on Nov. 16, 2023.

(51) Int. Cl.
*G06F 9/38* (2018.01)

(52) U.S. Cl.
CPC .......... *G06F 9/3838* (2013.01); *G06F 9/3836* (2013.01); *G06F 9/3887* (2013.01); *G06F 9/3888* (2023.08); *G06F 9/3844* (2013.01)

(58) Field of Classification Search
CPC .... G06F 9/3838; G06F 9/3888; G06F 9/3836; G06T 1/20
See application file for complete search history.

(56) References Cited

U.S. PATENT DOCUMENTS 6,542,987 B1 * 4/2003 Fischer .................... G06F 9/384 714/21
2017/0329741 A1 * 11/2017 Kim .................... G06F 9/30021
2022/0206899 A1 * 6/2022 Kalamatianos ....... G06F 9/3877
2022/0220644 A1 * 7/2022 Chen ..................... G06F 9/3851

OTHER PUBLICATIONS

Marc de Kruijf and Karthikeyan Sankaralingam, "Idempotent Processor Architecture", Dec. 3, ACM, pp. 140-150 (Year: 2011).*
Huerta et al. "Simple Out of Order Core for GPGPUs." Association for Computing Machinery, pp. 21-26, (2023).
Kim et al. "Warped-Preexecution: A GPU Pre-execution Approach for Improving Latency Hiding". IEEE Xplore, School of Electrical and Electronic Engineering, Yonsei University, Ming Hsieh Department of Electrical Engineering, University of Southern California, pp. 163-175, (2016).

(Continued)

*Primary Examiner* — Courtney P Spann
(74) *Attorney, Agent, or Firm* — Meagher Emanuel Laks Goldberg & Liao, LLP

(57) ABSTRACT

A processing unit leverages a decode stage's pool of instructions, thereby expanding available instruction choices and eliminating the need for expensive OoO techniques to identify reordering opportunities. The processing unit introduces instruction reordering by presenting an alternative instruction to the warp scheduler through the existing interface rather than offering the oldest instruction in each warp. The result is a simple and efficient OoO engine that operates predominantly in the processing unit's front end.

29 Claims, 12 Drawing Sheets

(56) References Cited

OTHER PUBLICATIONS

Yu et al. "MIPSGPU: Minimizing Pipeline Stalls for GPUs with Non-Blocking Execution." IEEE Transactions on Computers, 70(11), pp. 1804-1816, (2021).

Gong et al. "HAWS: Accelerating GPU Wavefront Execution through Selective Out-of-order Execution." ACM Transactions on Architecture and Code Optimization, 16(2), pp. 15:1-15:22, (2019).

Illakis et al. "Repurposing GPU Microarchitectures with Light-Weight Out-Of-Order Execution." IEEE Transactions on Parallel and Distributed Systems, 33(2), pp. 388-402, (2022).

* cited by examiner

LIGHTWEIGHT OUT OF ORDER SCHEDULER FOR PROCESSING UNITS

CROSS-REFERENCE TO RELATED APPLICATIONS

The present application claims priority to U.S. provisional patent application 63/599,760, filed Nov. 16, 2023, which is incorporated by reference herein by its entirety.

STATEMENT REGARDING FEDERALLY SPONSORED RESEARCH OR DEVELOPMENT

This invention was made with government support under Grant No. CCF2107257, awarded by the National Science Foundation. The government has certain rights in the invention.

TECHNICAL FIELD

The present disclosure is drawn to processing units, and particularly to techniques for more efficient instruction scheduling and power overhead reduction.

BACKGROUND

This section is intended to introduce the reader to various aspects of the art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

The various aspects discussed herein relate to processing units, for example, graphics processing units (GPUs) and central processing units (CPUs), which are responsible for executing instructions, performing computations, and managing data flow within a device. As demand for higher performance continues to grow, there is a concurrent desire to improve the efficiency of processing units while maintaining a compact physical size. One potential solution to this challenge is to leverage existing architecture within the front-end of a processing unit, such as the decode stage, to optimize performance and enhance overall system efficiency.

BRIEF SUMMARY

Various deficiencies in the prior art are addressed below by the disclosed systems, methods, and apparatus configured for processing units.

In various aspects, a processing unit may be provided. The processing unit may include a front-end. The front end may include an issue buffer. The issue buffer may be configured to receive instructions. The front end may also include a dependence checker. The dependence checker may be configured to receive instructions and detect any read-after-write (RAW), write-after-read (WAR), or write-after-write (WAW) hazards of each instruction. In some embodiments, the dependence checker may further be configured to mark and/or detect any read-after-write (RAW), write-after-read (WAR), or write-after-write (WAW) hazards of each instruction with instructions currently in the issue buffer.

The front end may further include an out-of-order (OoO) scheduler. The out-of-order scheduler may be operably coupled to the issue buffer and dependence checker. The out-of-order scheduler may be configured to select one or more instructions from the issue buffer for later stages.

In some embodiments, an instruction may be removed from the issue buffer after it is issued. The issue buffer may mark a space as empty after an instruction has been issued from the issue buffer.

In some embodiments, the processing unit may be a graphics processing unit.

In some embodiments, the processing unit may be configured to respect all register dependencies. The processing unit may be configured to issue all memory instructions in order with respect to each other. The processing unit may be configured to operate such that load instructions can be reordered against other load instructions but cannot be reordered against store instructions. The processing unit may be configured to operate such that store instructions are not reordered against any load or store instruction.

In some embodiments, the processing unit may be configured to check for idempotence in the dependence checker and may not issue non-idempotent instructions until a translation lookaside buffer hit or miss is determined for all prior load instructions.

In some embodiments, the processing unit may be configured to consider structural hazard when selecting instructions for out-of-order issue.

In some embodiments, the front-end may further include an instruction buffer. The instruction buffer may be configured to receive instructions and send the instructions to the dependence checker and the issue buffer when the issue buffer requests a new instruction. New instructions may only be fetched when the instruction buffer is empty.

In some embodiments, the processing unit may further include at least one warp scheduler configured to select at least one warp from its assigned warps and issue one or more instructions from that warp. The processing unit may utilize an out-of-order scheduler and separate warp scheduler. The out-of-order scheduler may look at one or more warps in each cycle to select one or more instructions which are ready for out-of-order issue. The warp scheduler may select one or more of the ready instructions from one or more warps and issue the selected one or more ready instructions.

In some embodiments, the out-of-order scheduler may know the instruction has no dependencies by means of an instruction encoding. The out-of-order scheduler may know the instruction has no dependencies by means of a scoreboard. After issuing an instruction, a single instruction, multiple threads (SIMT) stack and/or a scoreboard may be updated.

In some embodiments, the warp scheduler may be configured to use a scheduling policy that selects one or more instructions from one or more warps with no structural hazards. The processing unit may be configured to select a warp for dependence checking if there was a writeback to the warp and/or the warp does not have any valid entries in an instruction table.

In some embodiments, the processing unit may maintain a Warp-WriteBack (WWb) bit-vector and an ITabEmpty (ITE) bit vector where each bit corresponds to a warp. When a warp has a write-back, the corresponding bit in the WWb may be set. When a warp does not have any entries in the ITE, the corresponding ITE bit may be set to one. In a cycle, the processing unit may select warps whose WWb is set over warps whose ITE bit is set. After dependence checking for a warp, the WWb bit corresponding to the warp may be unset. When the ITE bit is set for a warp, the warp may be skipped for consideration by the warp scheduler in that cycle.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
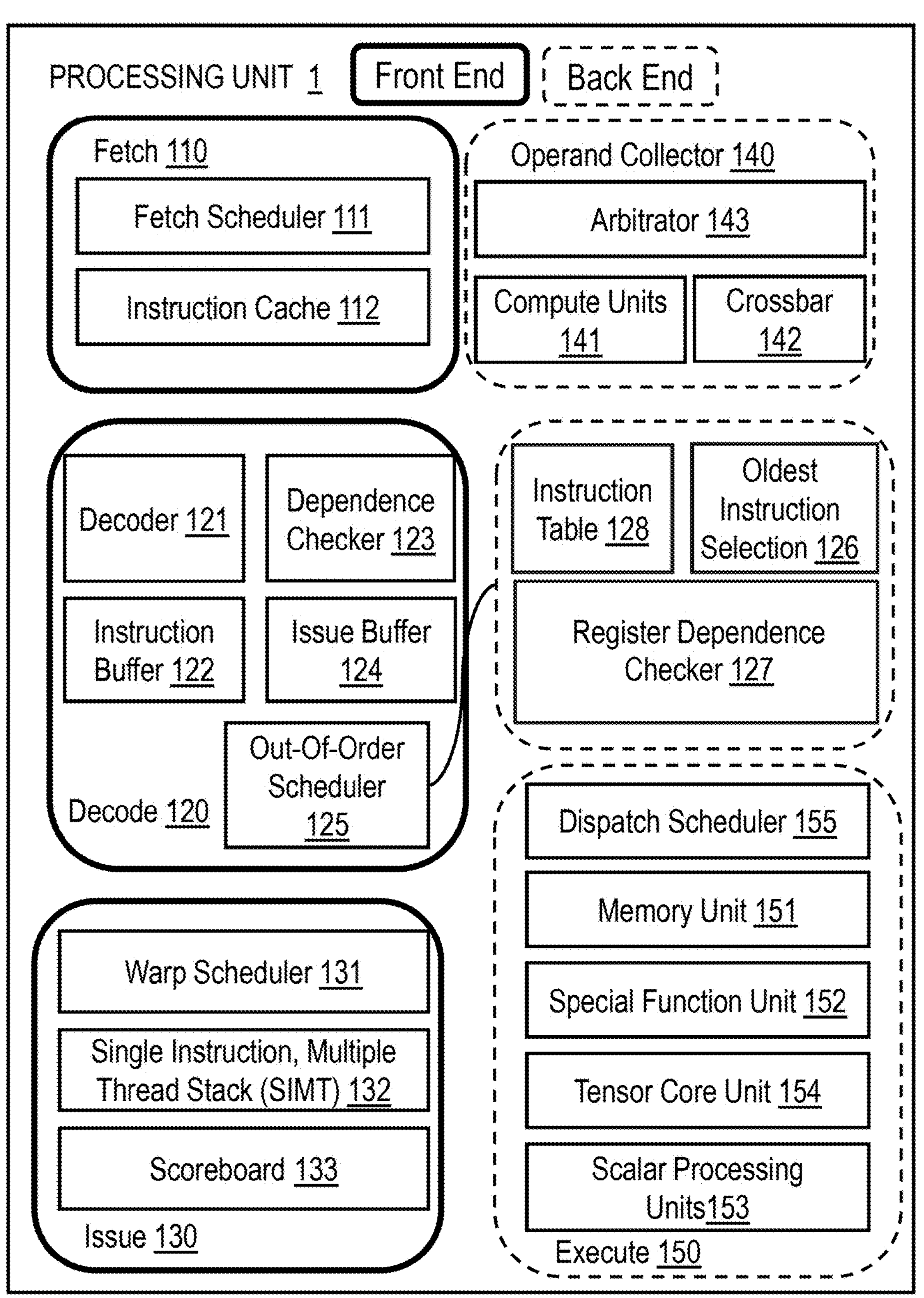
FIG. 1 shows a block diagram of a processor having multiple processing hardware elements.

It should be understood that the appended drawings are not necessarily to scale, presenting a somewhat simplified representation of various features illustrative of the basic principles of the invention. The specific design features of the sequence of operation as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Processing units have significantly enhanced the efficiency of computationally intensive applications, including medical imaging, machine learning, and computer vision, achieving orders of magnitude improvement. This efficiency is attributed to the Processing Unit capability to support massively parallel programming models and to reduce latency through concurrency, allowing rapid switching between concurrent warps. Despite these capabilities, processing unit applications still encounter significant stall cycles, during which none of the warps can issue instructions due to data, control, or structural hazards. Thus, there is a desire to provide a design that increases processing unit efficiency while maintaining minimal structural requirements.

In various aspects, a processing unit 1 may be provided. A processing unit refers to any hardware component or system responsible for executing instructions and performing computations within a computing device. The processing unit described herein is primarily discussed in the context of graphics processing units (GPUs). However, those skilled in the art, informed by the teachings of the present invention, will recognize that the described invention can also be applied to non-graphics processing units. For example, the present invention may be incorporated into other hardware processing units such as a central processing unit (CPU), tensor processing unit (TPU), physics processing unit (PPU), or any other non-virtual specialized processing units, such as a neural processing unit (NPU), digital signal processor (DSP), reduced instruction set computer (RISC), or application-specific integrated circuit (ASIC). The processing unit may interpret and process data according to a set of programmed instructions, performing operations such as arithmetic calculations, data manipulation, and control functions. The processing unit typically communicates with memory devices, input/output devices, and other system components to facilitate the operation of software applications or system processes, and can be configured to handle parallel processing, multitasking or other high-performance computations.

Referring now to FIG. 1, an embodiment of a processing unit with a plurality of processing elements is shown. The plurality of processing elements may include, for example, a fetch scheduler, decoder, instruction buffer, issue buffer, and more. The terms "processing elements" and "hardware" refer to various types of circuitry or processor components, including but not limited to arithmetic logic units, registers, and control units, which may work alone or in electronic communication, to perform one or more tasks.

The processing unit 1 may include a front-end and a back-end. Together the front end and back end may include six stages, each stage having a set of processing elements configured to perform one or more tasks. The front-end may include a fetch 110 and decode 120 stage (the front-end stages are denoted by bold lines). The back end of the processing element may include the collect operands 140 and execute 150 stage.

Figure 2:
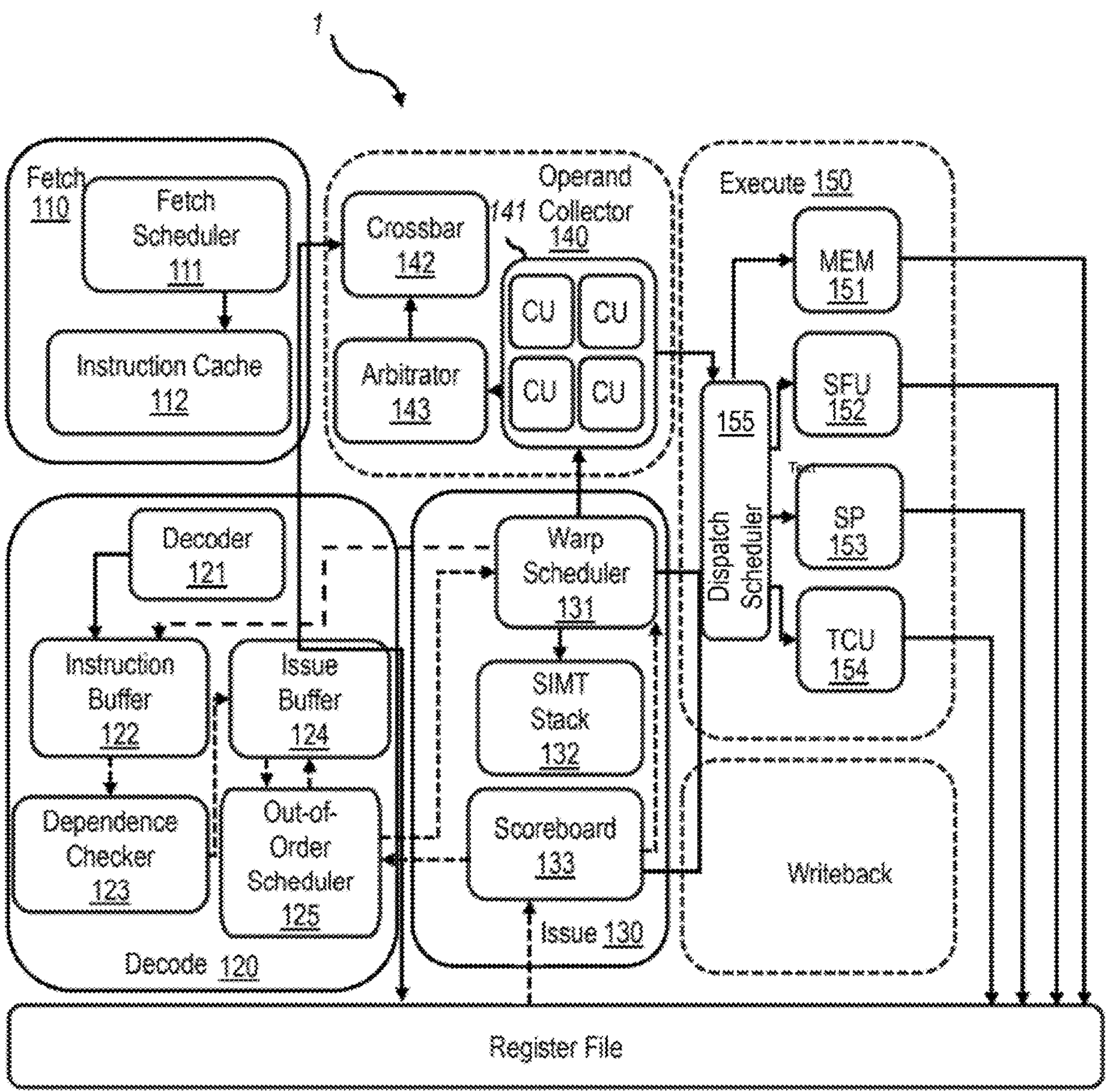
FIG. 2 shows an embodiment of a processing unit pipeline having an out-of-order scheduler.

Referring now to FIG. 2, an embodiment of a processing unit pipeline having six stages is shown. The processing unit may include a fetch stage 110. The fetch stage may include a fetch scheduler 111 and an instruction cache 112.

The processing unit 1 may include a decode stage 120. The decode stage may include a decoder 121, instruction buffer 122, dependence checker 123, issue buffer 124, and out-of-order scheduler 125. Additionally, the out-of-order scheduler may include hardware for an instruction table 128, register dependence checker 127, and an oldest instruction selection module 126.

The processing unit may include an issue stage 130. The issue stage may include a warp scheduler 131, single instruction, multiple thread (SIMT) stack 132, and scoreboard 133. The scoreboard may be an array of memory that stores information including, but not limited to, structural hazards and instructions which have issued or are awaiting issue.

The processing unit may include an operand collector stage 140. The operand collector stage may include a crossbar 142, arbitrator 143, and plurality of compute units 141. An execution stage may include a memory unit 151, special function unit 152, scalar processing unit 153, dispatch scheduler 155, and a tensor core unit 154.

Figure 3:
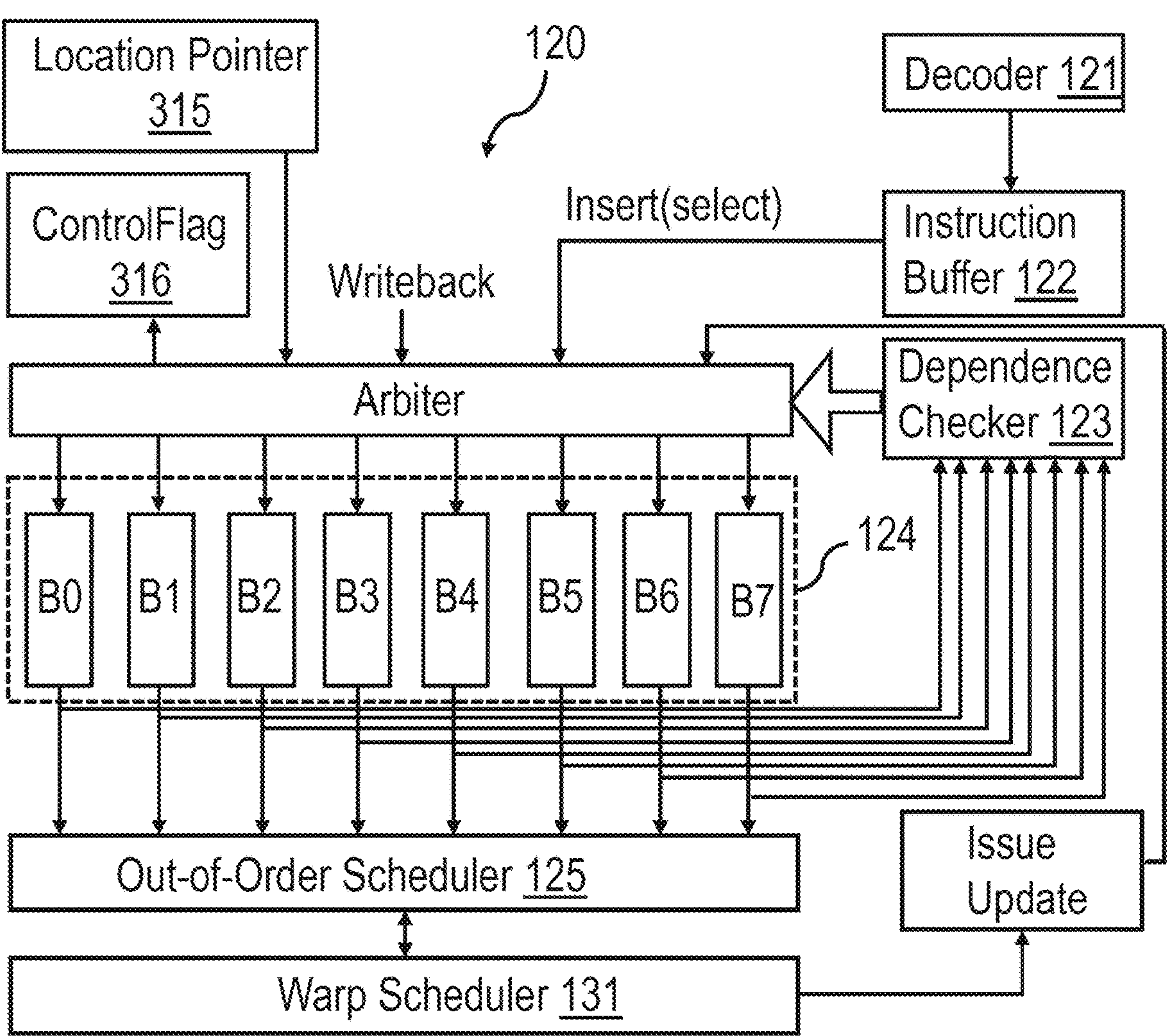
FIG. 3 shows an architectural diagram of a decode stage.

Referring now to FIG. 3, the front-end may include a dependence checker 123. The dependence checker may be included within a decode stage 120. The dependence checker 123 may be configured to receive a plurality of instructions. After instructions have been decoded by the decoder 121, the out-of-order scheduler selects instructions in-order from the instruction buffer 122 and places them in the dependence checker 123. The dependence checker 123 marks any dependence of the instructions with in-flight instructions and instructions currently in the issue buffer 124 to stop any incorrect out-of-order execution. In some embodiments, each scheduler may have four dependence checkers, equal to a decode throughput.

Figure 4:
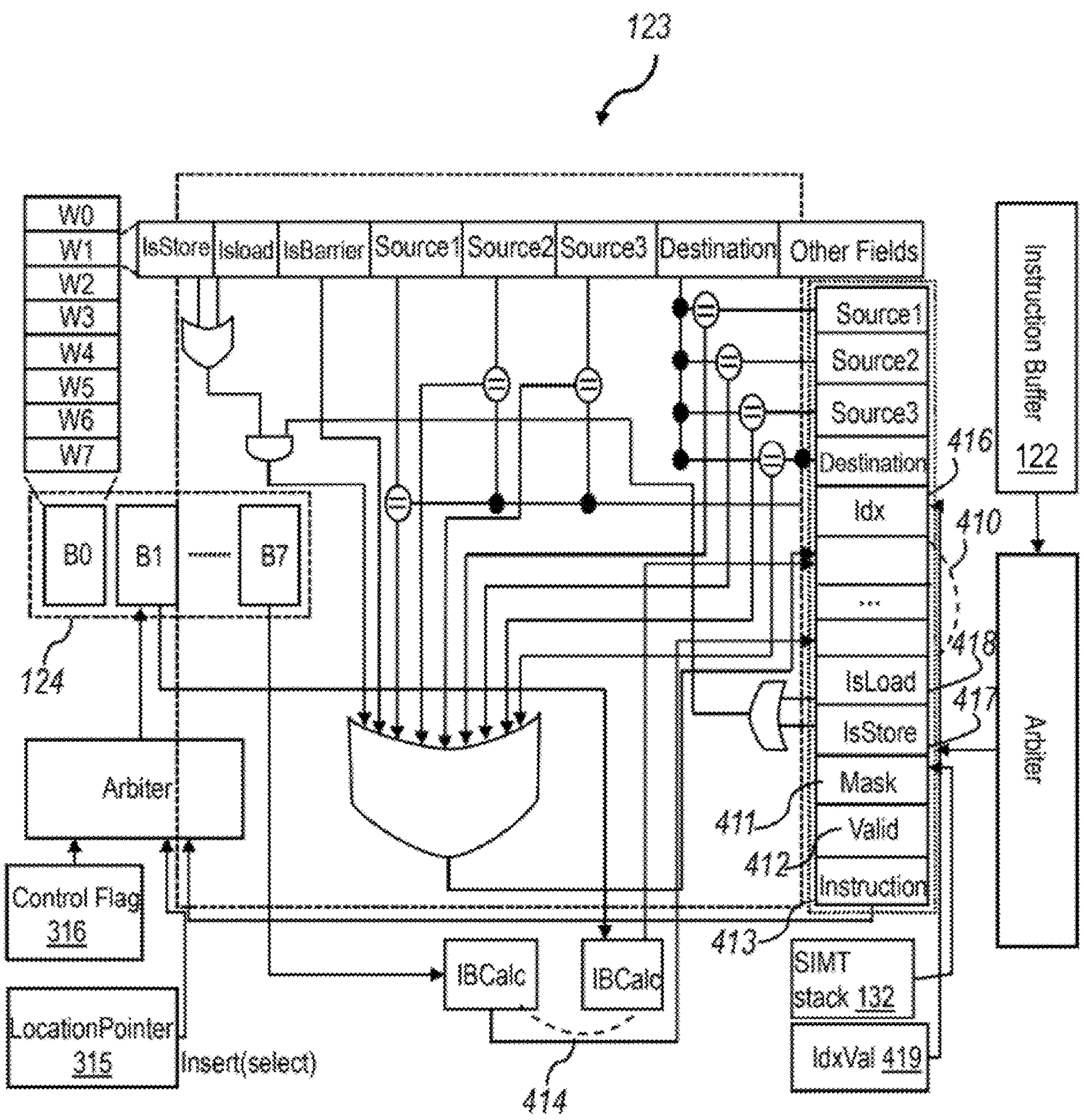
FIG. 4 shows a hardware diagram of a dependence checker which is a time-shared structure for warps in a scheduler.

Referring now to FIG. 4, a hardware diagram for the dependence checker is shown. The dependence checker may comprise of 8 instruction buffer-dependent calculation logic structures (IB-Calc) 414. Each IB-Calc 414 concurrently checks for write-after-read, read-after-write, and write-after-write dependencies on a register used by a current instruction against registers used by instructions of a same warp in an issue buffer. These checks are in addition to the read-after-write and write-after-write dependence checks performed in the baseline with in-flight instructions. Dependence checking in this manner ensures incorrect out-of-order issuing of instructions from the issue buffer are prevented. If any dependence is found between the instruction and any instruction in the issue buffer, an instruction buffer dependent bit-vector 410 entry is set to 1.

When the dependence checker has space, the oldest instruction in the instruction buffer from a warp, based on a decode scheduler, is placed in the dependence checker 123. The dependence checker 123 sets a plurality of bits for an instruction before it is placed in the issue buffer.

Still referring to FIG. 4, the dependence checker may set a validity bit 412. The validity bit 412 may correspond to the validity of an instruction and may be used to ensure that an instruction has no control hazards. The dependence checker may also set an index bit 416. The index bit 416 may track the age of an instruction. The index bit 416 may track the order in which instructions were placed in the issue buffer for a warp. Additionally, the dependence checker may check an instruction buffer dependency bit 410. The bit may be used to check for dependencies with older instructions in the issue buffer, and the dependence checker may update this bit based on the presence of such dependencies. Lastly, the dependence checker may check an instruction bit 413, which includes the decoded instruction to be executed.

Data Dependencies

In some embodiments, each IB-Calc unit may perform a plurality of checks against the corresponding issue buffer instructions before setting a bit in the instruction buffer dependency vector 410.

The IB-Calc 414 may perform data dependency checks. In addition to keeping track of any read-after-write and write-after-write dependencies with in-flight and pending issue buffer instructions as in the baseline, the IB-Calc may also check for any write-after-read dependencies of this instruction with any older instruction in the issue buffer 124. To keep track of dependencies in the issue buffer, read registers of the instruction in the dependence checker 123 are checked against the write registers of the instruction in the issue buffer 124 to identify read-after-write hazards. Similarly, the write register of the instruction in the dependence checker is checked against the read and write registers of the instructions in the issue buffer 124 to identify write-after-write and write-after-read hazards. If any dependence is found, the bit in the instruction buffer dependency vector 410 corresponding to the hazard causing instruction in the issue buffer is set to 1.

Memory Instructions

The IB-Calc 414 may also enforce no reordering of memory instruction and the correctness of execution of control instructions. Memory instructions may include load and/or store instructions. The processing unit 1 enforces memory instruction to execute in-order except for load-load pairs. This implies that load instructions to the same addresses can also be reordered, which is often not allowed in memory consistency models. However, the only way a thread can observe if two load instructions from the same address have been reordered is if another thread writes to the location. However, this would be a data race, and the re-ordering is allowed. The out-of-order scheduler does not reorder instructions marked as atomics by the compiler as this would violate memory model semantics.

The processing unit may be configured to operate such that load instructions can be reordered against other load instructions but cannot be reordered against store instructions. Similarly, the processing unit may be configured to operate such that store instructions are not reordered against any load or store instruction.

Again, referring to FIG. 4, IsLoad 418 and IsStore 417 bits may be used to determine if an instruction is a memory instruction. The dependence checker 123 may compare instructions in the dependence checker with instructions in the issue buffer 124. If the instruction in the dependence checker 123 is a load or store instruction, and the instruction in the issue buffer 124 it is being compared against is a store instruction or an atomic memory instruction, then the dependence checker instruction buffer dependency bit vector entry corresponding to the issue buffer memory instruction is set to 1. Since instructions are issued only if their instruction buffer-dependency bit vector is 0, this technique ensures that only load-load re-orderings are allowed.

Control Instructions

The processing unit 1 does not implement branch prediction and is configured to respect all register dependencies. Perfect branch prediction leaves the performance of the processing unit almost unmodified. Additionally, speculative execution comes with the additional complexity of enabling rollback for thousands of threads on mis-speculation.

The processing unit 1 allows the reordering of branch instructions with older instructions in the issue buffer while respecting all dependencies. Instructions after a branch instruction are not issued until the branch is resolved, avoiding any speculation. The mask 411 for the branch instruction is popped from the single instruction, multiple thread stack 132 and placed in the dependence checker (see FIG. 4), which is copied to the issue buffer when the instruction is moved. This avoids the serialization of instructions against branch convergence points.

Synchronization Instructions

When a synchronization instruction enters the dependence checker, it is not moved to the issue buffer 124 until all the instructions from the issue buffer 124 have been issued. When the synchronization instruction is moved to the issue buffer 124, the control flag 316 is raised, and new instructions are not moved to the issue buffer 124 (see FIG. 4). After the synchronization instruction has been issued and the branch has been resolved, the control flag 316 is unset, and instructions can be moved from the instruction buffer 122 to the dependence checker.

Mask and Index

The thread mask 411 for an instruction is picked up from the SIMT stack 132, and the entry is popped from the SIMT stack 132. The index value 419 is copied as the index in the dependence checker, and the index value counter for the warp is incremented.

Issue Buffer

In some embodiments, the decode stage may further include an issue buffer 124. The issue buffer may be configured to receive instructions from the dependence checker 123 and/or a decoder and dependence information from the dependence checker. Instructions may be moved from the dependence checker to the issue buffer from where they are selected for issue using the out-of-order scheduler. The issue buffer may be configured to have an empty slot corresponding to a warp that an incoming instruction belongs to.

In some embodiments, when an instruction is moved into the issue buffer 124, it is placed in an empty slot pointed to by the location pointer 315 for the warp (see FIG. 4), which is a first in, first out (FIFO) queue of locations of empty issue buffer slots for the warp. The location pointer 315 then points to the next empty location in the issue buffer 124 or marks the issue buffer as full, so new instructions are not moved from the dependence checker to the issue buffer. Index bits 416 are used to track the order of instructions. The issue buffer may be modeled as an 8-way banked structure, and each entry of a given bank corresponds to a different warp. Instructions are read from the issue buffer by the out-of-order scheduler 125 to find valid instructions with no data dependence, which can be considered for issue by the warp scheduler 131. When an instruction is issued from a warp, the instruction buffer-dependent bits corresponding to the issued instruction are set to 0 for instructions in the issue buffer for that warp.

Out-of-Order Scheduler

The decode stage 120 may include an out-of-order scheduler 125 operably coupled to the issue buffer and the dependence checker. The out-of-order scheduler may be configured to select one or more instructions from the issue buffer with no data dependencies for execution. Although the out-of-order scheduler is depicted as being a part of the decode stage, the out-of-order scheduler could alternatively be included in either the issue or fetch stage. Recent out-of-order scheduling techniques have focused on back-end applications for out-of-order scheduling, however, the disclosed processing unit implements the out-of-order scheduling in the front-end, namely before the operand collection stage.

Figure 5:
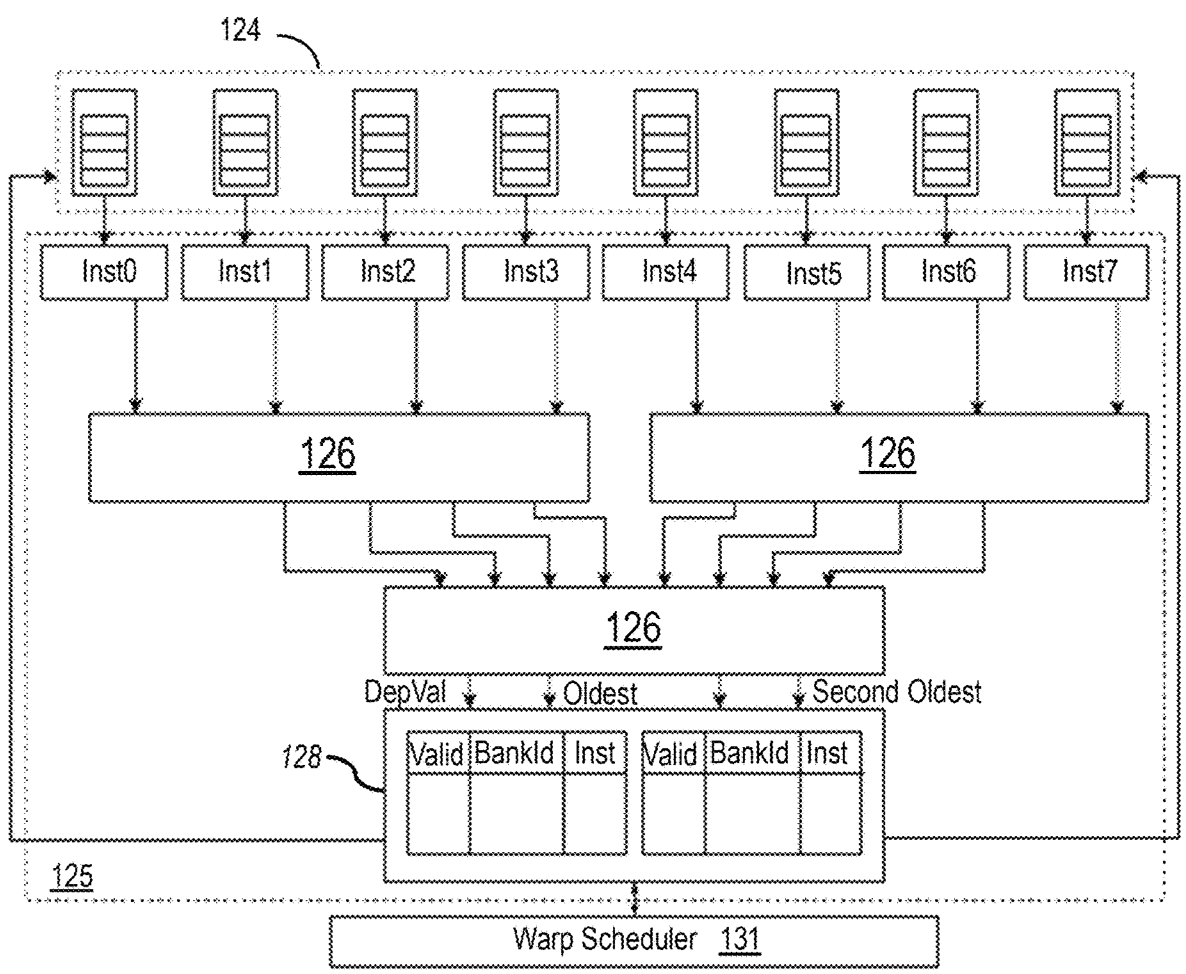
FIG. 5 shows an embodiment of a time-shared out-of-order scheduler for a processing unit.

Referring now to FIG. 5, the out-of-order scheduler may include hardware for an instruction table 128, register dependence checker 127 (not shown in FIG. 5) and an oldest instruction selection module 126. The out-of-order scheduler may be configured to select one or more instructions from the issue buffer 124 with no data dependencies for execution. The out-of-order scheduler may be a time-shared structure across warps that serves two functionalities.

First, the out-of-order scheduler may select up to two instructions per warp from the issue buffer that do not have a data dependence on any older instruction in the issue buffer 124 and in-flight instructions. The at least two instructions may be passed through a register dependence checker (further detailed below) to check for data dependencies and the validity of the instruction.

Second, it may buffer those instructions in an instruction table 128 for the warp scheduler 131 to consider during the issue stage 130 scheduling. The selection logic involves choosing instructions for a given warp at any given time. The out-of-order scheduler may select a warp to place an instruction in the instruction table 128 if (1) there was a writeback to the warp or (2) the warp has empty space in the instruction table. The time-shared nature of the out-of-order scheduler reduces the area and power overhead of implementing the out-of-order scheduler. Moreover, it leaves the interface to the warp scheduler 131 unmodified.

Additionally, the out-of-order scheduler may be configured to know that an instruction has no dependencies by checking a scoreboard. In other embodiments, the out-of-order scheduler may know that an instruction has no dependencies by means of an encoding.

Instruction Buffer

In some embodiments, the processing unit 1 may further include an instruction buffer 122. The instruction buffer may be configured to receive decoded instructions and send the decoded instructions to the dependence checker and the issue buffer when the issue buffer requests a new instruction. The new instructions may be fetched only when the instruction buffer is empty. In some embodiments, the issue buffer always has instructions to be considered for out-of-order issue.

Issue Stage

In some embodiments, the processing unit 1 may further include an issue stage 130. The issue stage may include at least one warp scheduler 131. The at least one warp scheduler may be configured to select at least one warp from its assigned warps and issue one or more instructions from it. In addition to the at least one warp scheduler, the issue stage may also include at least one SIMT stack 132 and at least one scoreboard 133. In each cycle the warp scheduler may select one warp from assigned warps and issue an instruction from the assigned warps.

The processing unit may utilize multi-level instruction scheduling with the out-of-order scheduler. The out-of-order scheduler may look at one or more warps in each cycle to select one or more instruction which are ready for out-of-order issue and store the selected one or more instructions in an instruction table. In some embodiments, the warp scheduler may select one or more of the ready instructions from one or more warps in the instruction table and issue the selected one or more ready instructions.

Warp Scheduler

A warp scheduler 131 considers the oldest ready instruction pointed to it by the out-of-order scheduler 125. If the out-of-order scheduler has not marked any instruction as ready for issue for a warp, then the warp scheduler considers the oldest instruction for the warp. The warp scheduler checks for any structural hazards before issuing an instruction for the operand collector stage 140.

In some embodiments, the warp scheduler is configured to use a scheduling policy that selects one or more instructions from one or more warps with no structural hazards.

In some embodiments, the at least one warp scheduler may issue an instruction when (i) its program counter (PC) matches the PC expected by a single instruction, multiples threads stack; (ii) it passes a scoreboard (SB) check, which identifies any data hazards (Read-After-Write and Write-After-Write); and (iii) it secures available pipeline registers. The program counter may be a register within the processing unit that includes a memory address of a next program instruction to be executed. A scoreboard may be an array of memory that is used to store bits of information including but not limited to structural hazards and instructions that have issued or are awaiting issue. The at least one warp scheduler may confirm with the scoreboard that the instruction is valid and ready for issue.

In some embodiments, a single instruction, multiple threads (SIMT) stack 132 and/or a scoreboard 133 (SB) is/are updated after the processing unit issues an instruction. Updating the SIMT stack 132 may include clearing the scoreboard's array of memory. In some embodiments, updating the SIMT stack 132 may include storing additional structural hazard information. In some embodiments, updating the SIMT stack 132 may include storing an instruction that has issued or is awaiting issue. Additionally, the scoreboard may be configured to store dependency information.

In some embodiments, the instruction table may be configured to be free of repeated queries. The queries may include instructions that have issued or are awaiting issue.

In some embodiments, the warp scheduler 131 may be configured to use a scheduling policy that prioritizes an oldest ready instruction of a warp with no structural hazards. A hardware implementation of an out-of-order scheduler is shown in FIG. 5. When the out-of-order scheduler selects a warp, a register dependence checker 127 is used to check for data dependencies and the validity of the instruction (see FIG. 7).

Figure 6:
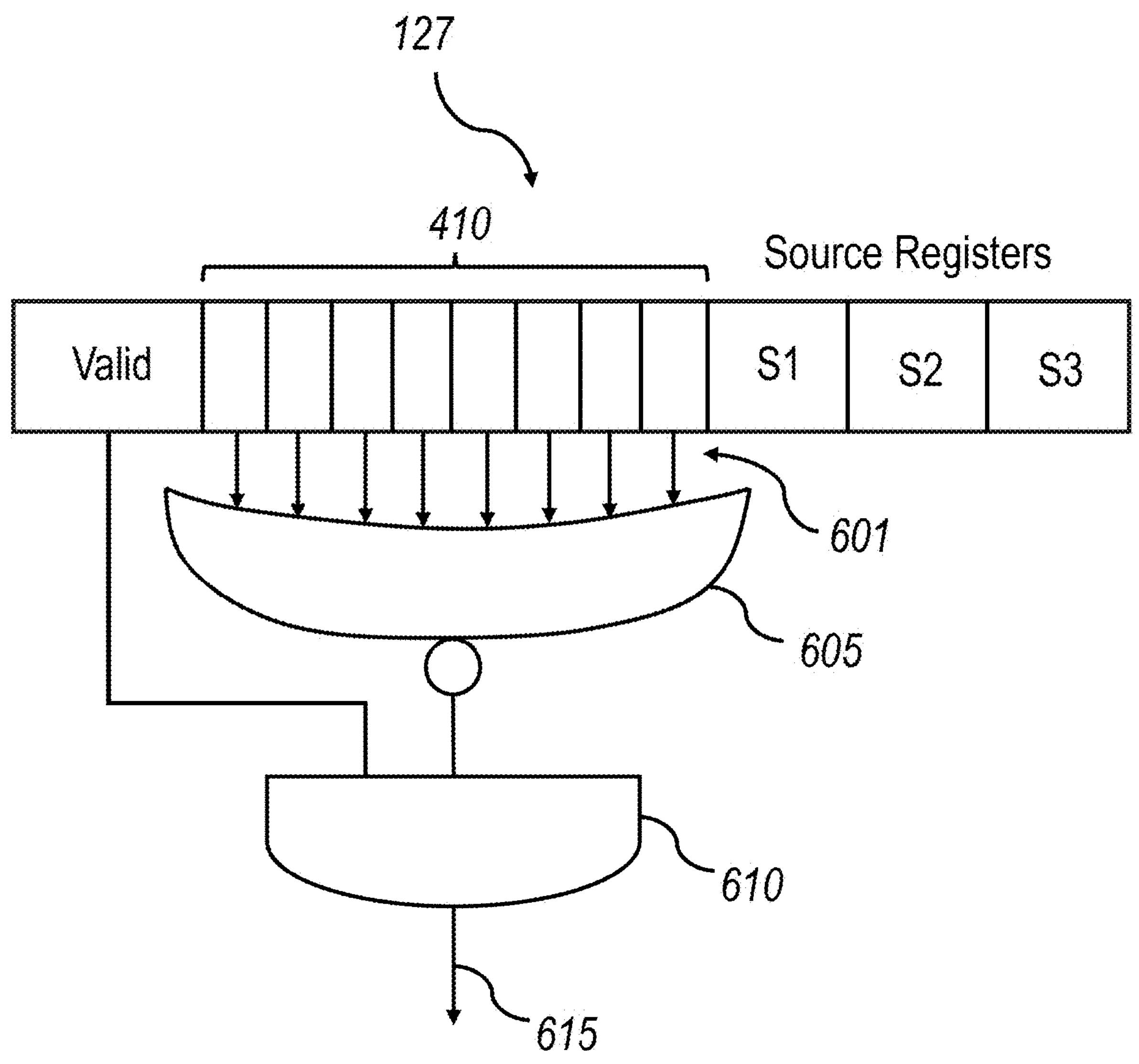
FIG. 6 shows a hardware diagram for register dependence checking for an out-of-order scheduler.

Referring to FIG. 6, The register dependency checker 127 may include at least two logic gates. The at least two logic gates may include a NAND 605 gate and an AND 610 gate. The NAND gate 605 may be configured to receive a plurality of signals 601 from an instruction dependency vector 410. The NAND gate may be configured to check for any data hazards with another instruction in the issue buffer or any in-flight instructions. The NAND gate may then be configured to send a signal to the AND gate 610. The AND gate may also receive a signal from the instruction dependency vector corresponding to a validity bit and may check if the received NAND gate signal is valid. If the instruction is valid and has no data dependencies, the register dependence checker may give an output signal 615 of 1. This outputted signal from the register dependence checker is sent to an oldest instruction selection module.

Figure 7:
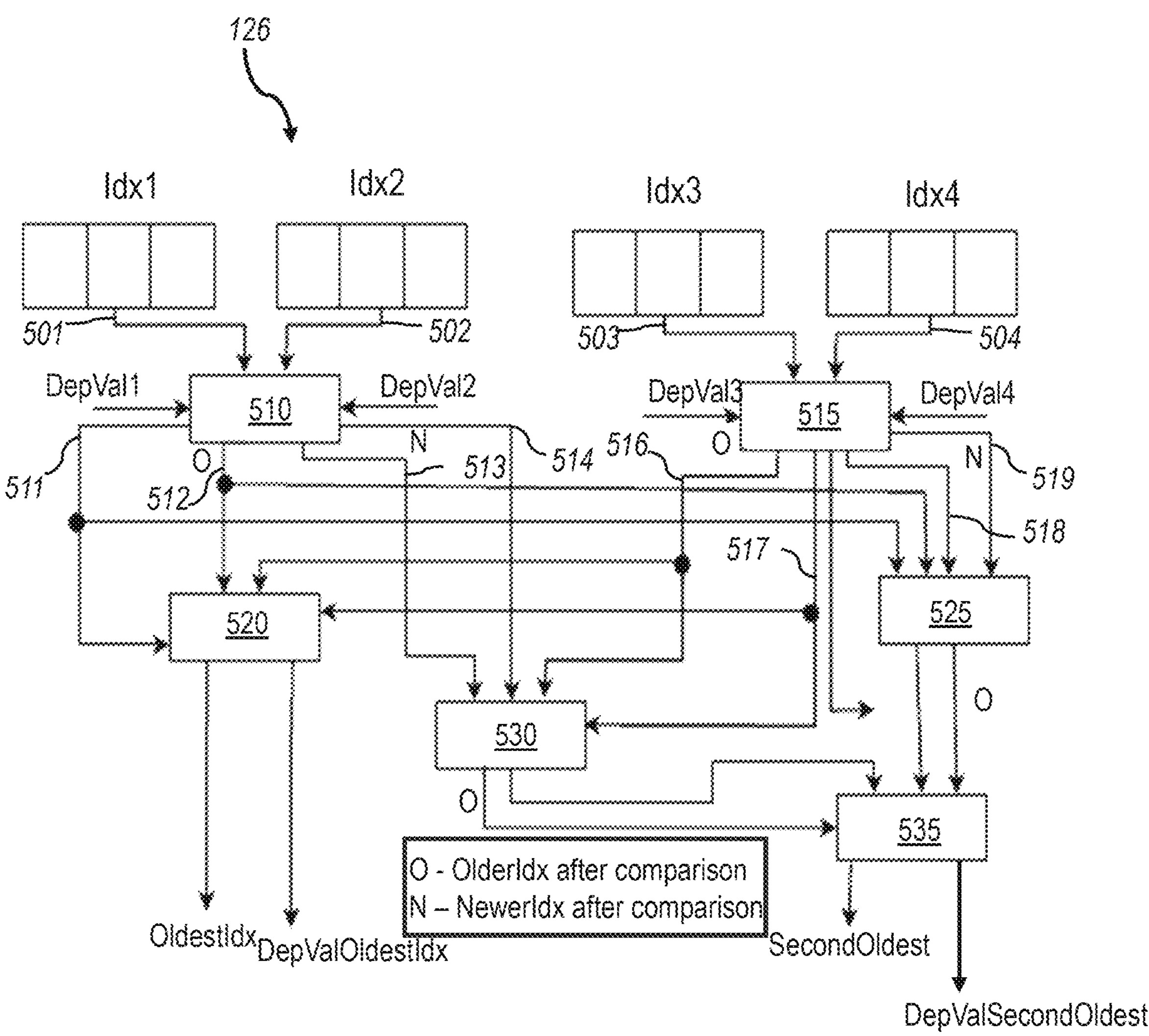
FIG. 7 shows a hardware diagram of an oldest instruction selection module for an out-of-order scheduler.

Referring now to FIG. 7, a diagram for oldest instruction selection hardware is shown. The oldest instruction selection hardware has a plurality of instruction age comparators 510, 515, 520, 525, 530, 535. The plurality of instruction age comparators may be configured to receive and compare a plurality of instruction signals. The plurality of signals may include a bit corresponding to the age of an instruction. A first age comparator 510 may compare a first 501 and second 502 instruction signal. A second age comparator 515 may compare a third 503 and fourth 504 instruction signal. The first and second comparators, after comparing the instruction age signals may each provide four comparison signals 511-514, 516-519 two comparison signals for the older instructions, two comparison signals for the newer instructions. The four signals may again be compared by a plurality of other comparators, shown as comparators 520, 525, 530, 535. After the signals have been passed through the comparators, the oldest instruction selection hardware selects the two oldest instructions and places the instructions in an instruction table 128 (see FIG. 5), sets the bit of the placed instructions as 1, and stores the bank identifier of the location of this instruction in the issue buffer 124.

The warp scheduler 131 may select instructions from the instruction table 128 after the oldest instruction selection module 126 places the oldest instructions into the instruction table. When an instruction is issued from the instruction table 128, for all instructions in the issue buffer 124 belonging to the same warp as the issued instruction, an instruction buffer dependent bit in the instruction buffer dependent bit vector 410 corresponding to the issued instruction is set to 0. This marks all write-after-read dependencies of the issued instruction on newer instructions in the issue buffer as resolved. Read-after-write and write-after-write dependencies of in-flight and older issue buffer instructions are checked against the dependence vector before issue (same as baseline), ensuring correct execution.

Additionally, for all instructions from the warp with an index value greater than the index of the issued instruction, the index value is reduced by one. The entry of this instruction in the issue buffer 124 is marked as invalid, and the bank identifier is added to the location pointer queue for the warp.

In some embodiments, the issue buffer 124 may be configured to have an empty slot corresponding to a warp that an incoming instruction belongs to. When an instruction is moved into the issue buffer 124, it is placed in an empty slot pointed to by the location pointer for the warp, which is a first in, first out queue of locations of empty issue buffer slots for the warp. The location pointer 315 then points to the next empty location or marks the issue buffer as full, so new instructions are not moved from the dependence checker to the issue buffer.

In some embodiments, the processing unit 1 may be configured to select a warp for dependence checking if there was a writeback to the warp and/or the warp does not have any valid entries in the instruction table. In some embodiments, the processing unit maintains a Warp-WriteBack (WWb) bit-vector and an instruction table empty (ITE) bit vector where each bit corresponds to a warp.

In some embodiments, when a warp has a write-back, the corresponding bit in the WWb is set. When a warp does not have any entries in the ITE, the corresponding ITE may be set to one. The ITE bit is unset for a warp after instructions are placed in the instruction table.

In some embodiments, after dependence checking for a warp, the WWb bit corresponding to the warp may be set. In some embodiments, when independent instructions are found and placed in the ITE, the ITE bit corresponding to the warp may be unset. In some embodiments, when the ITE bit is set for a warp, the warp may be skipped for consideration by the warp scheduler in that cycle. Setting the WWb or ITE may include setting a bit value in the corresponding vector to one or zero. In some embodiments, setting the WWb or ITE may include clearing the vector's array of memory.

In some embodiments, in a cycle, the processing unit may round-robin over warps and prioritizes warps whose WWb bit is set over warps whose ITE bit is set. The processing unit may round-robin in more than one manner. In one embodiment, the processing unit may operate in a lose round robin, which round robins over warps to find a ready warp for issue. In another embodiment, the processing unit may operate in a strong round robin, which only looks at the next warp to be considered for scheduling. In one more embodiment, the processing unit may operate in a greedy-then oldest manner, which selects the same warp for scheduling until it stalls, then moves to the oldest ready warp.

Exception Handling

In the GPU context, GPU's may have very limited support for exception handling, and the process running on the GPU may be terminated on encountering errors. When a warp encounters a page fault, the page fault is treated as a long stall, on, eg., the Nvdia GPU. Since the disclosed processing unit is non-speculative, it can handle page faults in graphics processing units without any modifications. Like current graphics processing units, the disclosed processing unit can return the error code for an exception during execution. However, below, we describe how to add support for precise exceptions if needed.

The processing unit can be extended to support out-of-order execution with precise exception handling for virtual memory in the event kernel-level context switching on page faults is desirable. Idempotent instruction sequences are ones that can be re-executed without changing the result. The processing unit may utilize compiler support to mark non-idempotent instructions and adds two additional constraints to the processing unit. First, load instructions may not be reordered against each other. Second, non-idempotent instructions are not issued till all prior load instructions have hit a translation lookaside buffer.

In order to support the processing unit which handles exception handling, additional hardware is required. A LoadCounter may be required. Each warp may have a load counter to maintain the number of loads in a pipeline which has not done a translation lookaside buffer check. When a load instruction enters the dependence checker, it increments the LoadCounter, and decrements after the translation lookaside buffer check.

An InstLoadCounter may also be required. When an instruction enters the dependence checker the value of the LoadCounter is copied into the InstLoadCounter and placed with the instruction in the Issue Buffer. When a load instruction for a warp has a translation lookaside buffer hit the InstLoadCounter for all entries in the Issue Buffer for the warp are right-shifted by 1 bit.

Figure 8A:
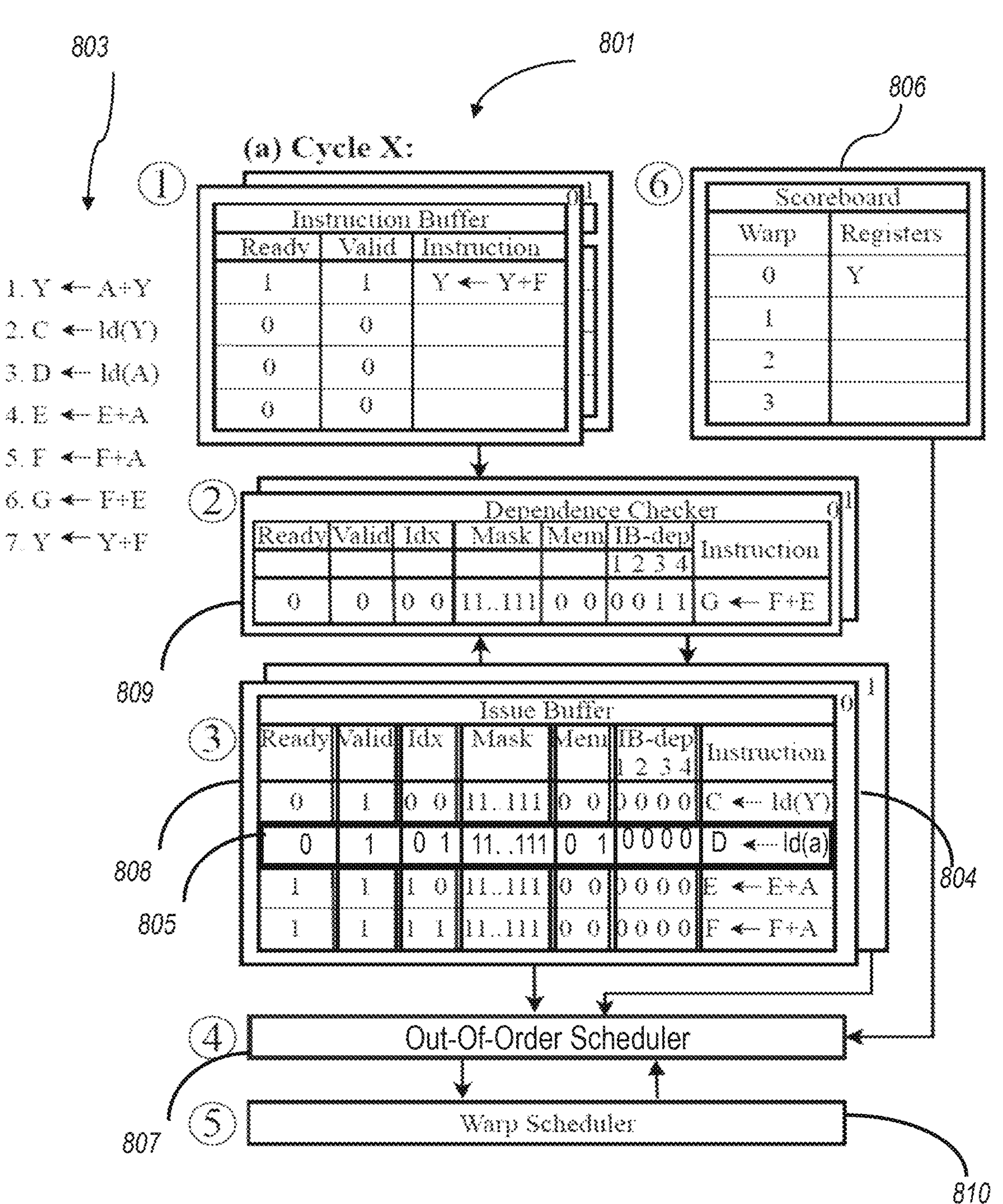
FIGS. 8A-B show an example execution of a small program on a processing unit having an out-of-order scheduler.
Figure 8B:
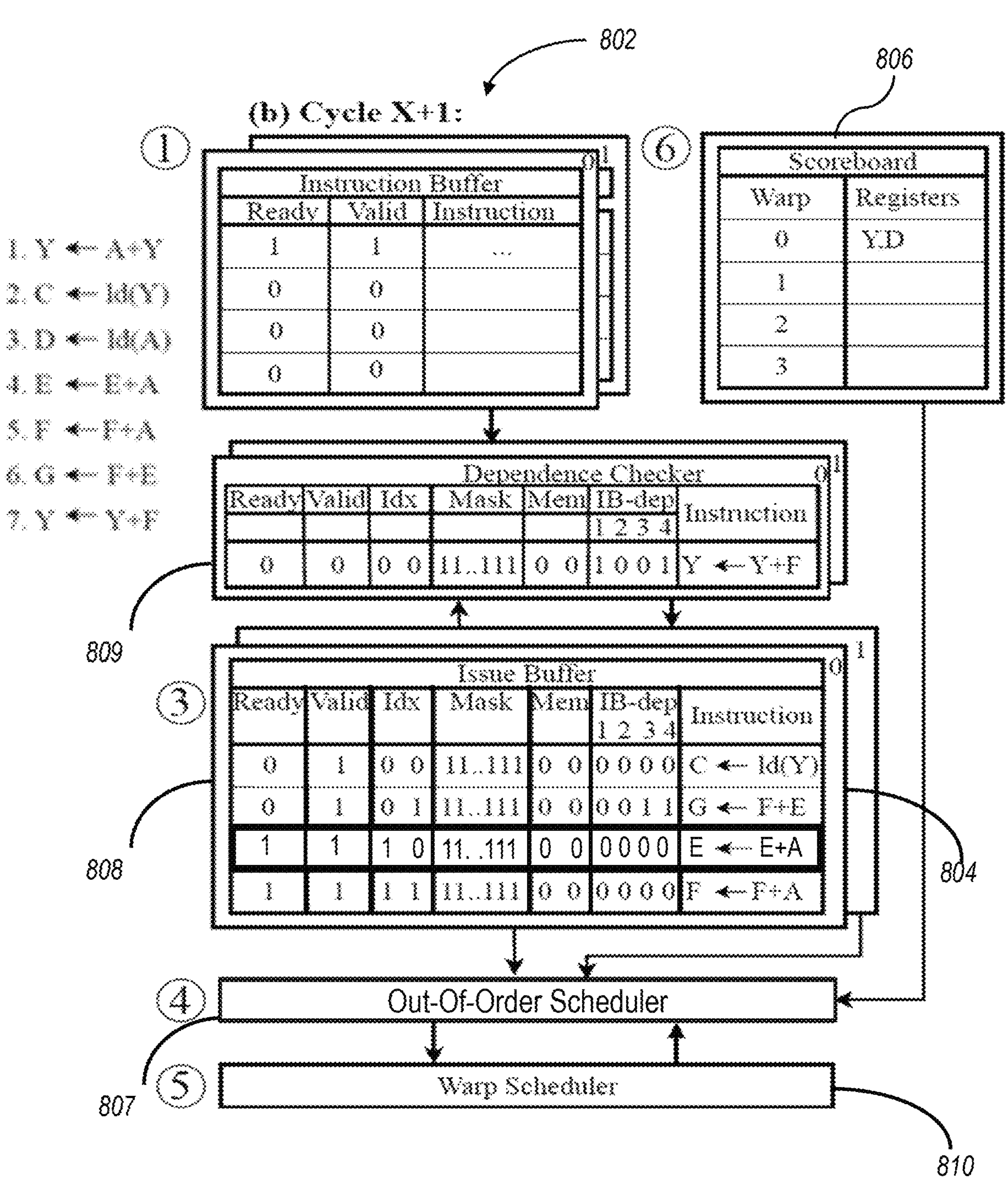

Referring now to FIGS. 8A-B, an illustration of the processing unit 1 executing a small program is shown. FIG. 8A, shows the movement of a plurality of instructions 803 between the instruction buffer, dependence checker, and issue buffer as a small program executes out-of-order execution using the disclosed processing unit. Referring to FIG. 8A, in the first cycle 801, instruction 1 has been issued. The scoreboard 806 has been updated and shows that instruction 1 ("Y") has issued. Instruction 2 is stalled as it has a read-after-write dependence on instruction 1. The out-of-order scheduler 807 has marked instruction 2 as the oldest instruction ready for issue and instruction 4 as the next oldest ready for issue in the previous cycle. The warp scheduler 810 issues instruction 3 805 out-of-order after checking for structural hazards. Warp 0 804 goes to the out-of-order scheduler 807 to get the new oldest ready instructions.

Now referring to FIG. 8B, a second cycle 802 of the processing unit executing a small program is shown. The scoreboard 806 has been updated and shows that instruction 3 has been issued. Here, instruction 6 is moved from the dependence checker 809 to the issue buffer 808, and instruction 7 is moved into the dependence checker 809. The out-of-order scheduler 807 is pointing to instruction 4 as the oldest ready instruction, which is issued out-of-order from the warp scheduler 810.

Experimental Evaluation of the Disclosed Processing Unit

The disclosed processing unit architecture was implemented on top of simulated Nvidia RTX 2060S and RTX 3070 GPUs, which are included with an Accel-Sim simulator. To implement the disclosed processing unit architecture, a dependence checker stage was added between the instruction buffer and the issue buffer. The out-of-order scheduler was coupled to the issue buffer, the scoreboard and the warp scheduler. Out-of-order control logic was added for the out-of-order scheduler. The depth of the decoder, instruction buffer and issue buffer was parameterized to study the effect of increasing issue buffer size on the disclosed processing unit.

Twenty-eight GPU applications from standard benchmark suites, namely Rodina, GPGPU-Sim, Pannotia, and Tango were used to evaluate the GPU. The benchmarks cover various GPU domains, including irregular graph processing and large-scale neural networks, and are classified in Table I. SASS traces were collected on the NVIDIA RTX 2060S GPU for these applications to feed into the simulator. Inputs were selected to maximize the input size while ensuring that the GPU did not run out of memory during SASS collection.

TABLE I

Evaluated Benchmark Programs

| Benchmark Suite | Benchmarks |
|---|---|
| Ipass | bfs (IBFS), LPS, LIB, RAY, STO |
| Pagoda | beamformer (BFM), DCT, DES, convolution (CNV), mandelbrot (MND), matrixMul, multiwork (MWK) |
| Pannotia | SSSP, Floyd-Warshall (FW) |
| Rodina | b + tree (B + T), dwt2d (DWT), Gaussian (GAS), lavaMD (LAV), LUD, NN, bfs (RBF), myocyte (MYO), particlefilter-float (PFF), srad-v1 (SRA), backprop (BAK) |
| Tango | CN, GRU, LSTM |

Figure 9:
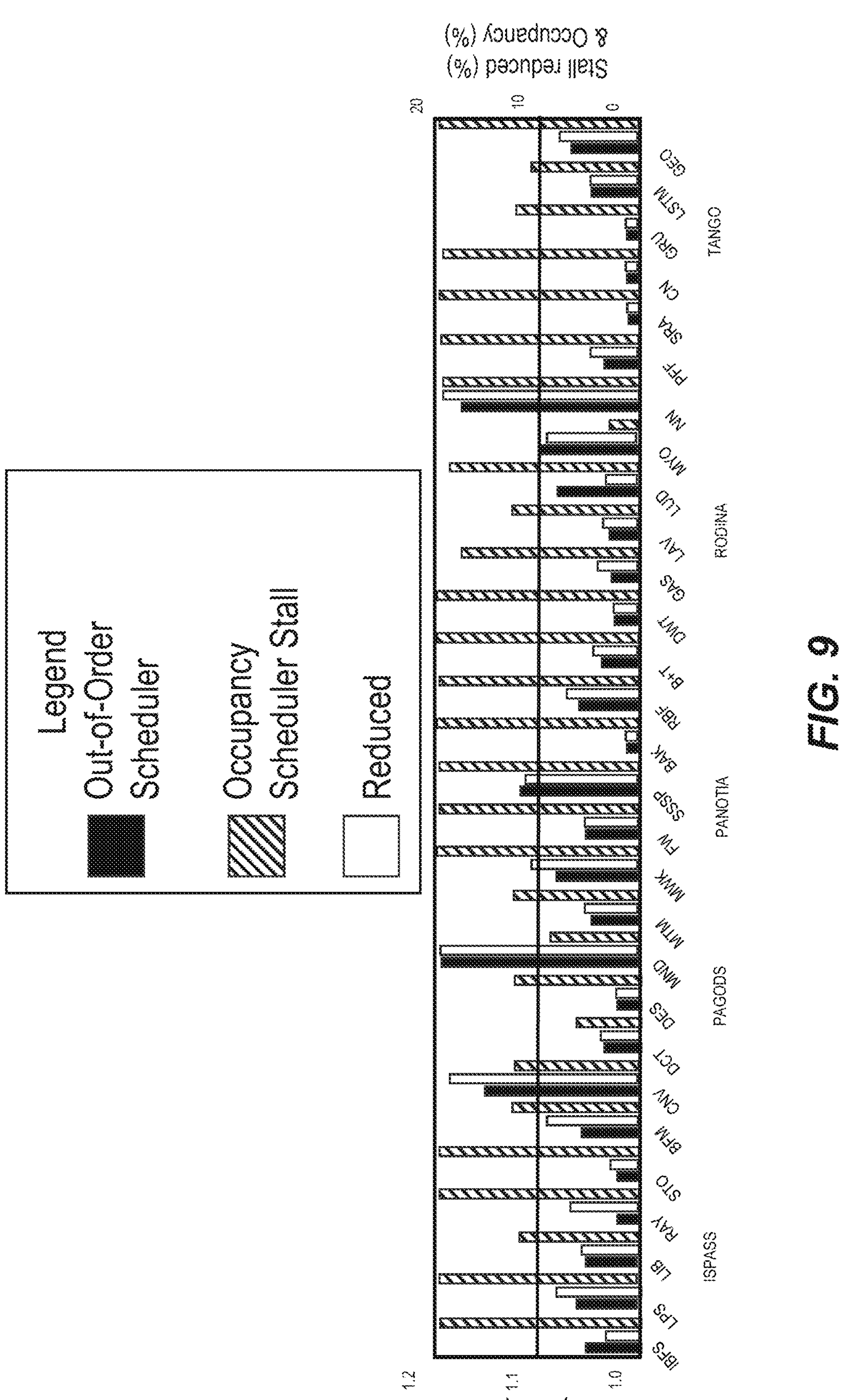
FIG. 9 shows the performance of an out-of-order scheduler and the reduction in scheduler stalls with out-of-order execution plotted against the occupancy of applications on a simulated GPU.

Referring now to FIG. 9, the speedup of the GPU, the reduction in scheduler stalls with out-of-order execution and the average occupancy for each benchmark on the simulated RTX 2060S GPU is shown (speedup is the measurement of relative performance of two systems processing the same problem). GPU occupancy measures the ratio of active warps to the maximum possible warps on a streaming processor (SM), reflecting the utilization of computational resources. Both the disclosed processing unit and the baseline have four instructions in the issue buffer. The disclosed processing unit gives a speedup of 6.9% over the baseline on the simulated RTX 2060S GPU. The reduction in the scheduler stalls when a scheduler cannot find any instruction ready for issue due to data and/or structural hazards reduces in proportion to the speedup lent by the disclosed processing unit using out-of-order execution. Although the baseline offers the most optimized binary for the hardware it runs on, the disclosed processing unit can further improve the runtime of the programs by dynamically reordering instructions, even for applications with high occupancy, while significantly improving the performance of low occupancy workloads.

Figure 10:
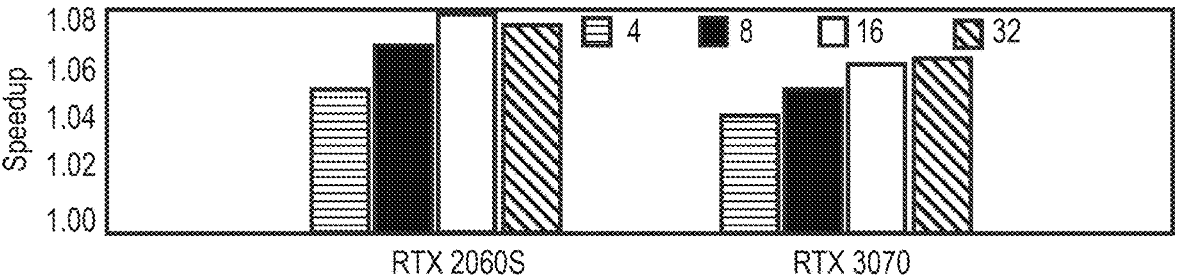
FIG. 10 shows the performance variance of the out-of-order scheduler with changing issue buffer size.

Referring now to FIG. 10, a graph of the performance variance of the disclosed out-of-order scheduler with changing issue buffer size on a simulated GPU is shown. As the graph shows, the size of the issue buffer influences the performance of the GPU's out-of-order execution, while the size of the instruction buffer remains constant on the simulated GPU. The disclosed processing unit consistently outperforms in-order execution. The geomean speedups for an issue buffer size of 8 is between 5-6.9%. As the issue buffer size increases further to 16 and 32 entries per warp, the performance further increases to between 5.9-7.9%. Even though configurations 16 and 32 perform better than issue buffer size 8, these configurations increase the control logic to enable the GPU exponentially. An issue buffer size is preferably 8, considering the trade-off between out-of-order performance and hardware overhead.

Figure 11:
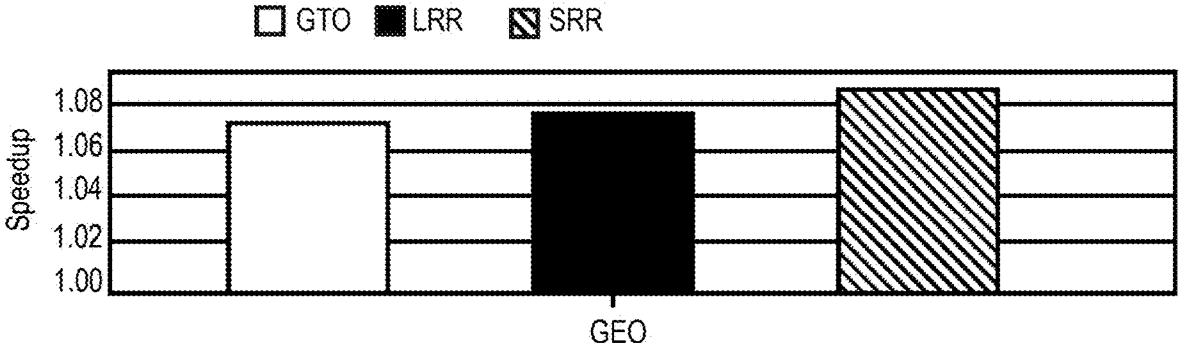
FIG. 11 shows the performance variance of the out-of-order scheduler with changing scheduling policies.

Referring now to FIG. 11, the performance of the out-of-order scheduler with three different warp scheduling policies on a simulated GPU is shown. The first bar shows the speedup for a greedy-then-oldest (GTO) scheduling policy. A GTO scheduling policy selects the same warp for scheduling until it stalls, then moves to the oldest ready warp. The second bar shows the speedup for a lose round robin (LRR) scheduling policy. The LRR scheduling policy robins over warps to find a ready warp for issue. The third bar shows the speedup for a strong round robin (SRR). An SRR policy only looks at the next warp to be considered for scheduling. As the scheduling policy becomes less aggressive (SRR), the performance of the GPU improves as out-of-order execution has a greater impact on finding instructions that are ready for issue.

The design of the dependence checker, issue buffer, and out-of-order scheduler were modeled in RTL. Synopsys was used to calculate the area and power of the hardware components added by the disclosed processing unit on a 45 nm technology node. The disclosed processing unit adds 1276 $\mu m^2$ of area per scheduler, or 0.173536 $mm^2$ area per GPU. The NVDIA RTX 2060S GPU was developed on the 12 nm technology node and has an area of 445 $mm^2$. To get the area estimate for the disclosed processing unit, a multiplicative factor of 0.17 was used to convert the area analysis to a 14 nm technology node to get an upper limit estimate for the area increase with the disclosed processing unit. The disclosed processing unit increases the area of the processing unit 0.007% with a 1.1707 mW increase in power.

It will be appreciated that the functions depicted and described herein may be implemented in hardware or in a combination of software and hardware, e.g., using a general-purpose computer, one or more application specific integrated circuits (ASIC), or any other hardware equivalents. It is contemplated that some of the steps discussed herein may be implemented within hardware, for example, as circuitry that cooperates with the processor to perform various steps of the disclosed processing unit. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is determined according to the claims.

What is claimed is:

1. A processing unit, comprising:
a front-end including:
an issue buffer configured to receive instructions;
a dependence checker circuit configured to receive instructions and detect any read-after-write (RAW), write-after-read (WAR), or write-after-write (WAW) hazards of each instruction; and
an out-of-order (OoO) scheduler operably coupled to the issue buffer and dependence checker circuit, the OoO scheduler configured to select one or more instructions from the issue buffer for later stages;
wherein the processing unit is configured to check for idempotence in the dependence checker circuit and does not issue non-idempotent instructions until a translation lookaside buffer hit or miss is determined for all prior load instructions.

2. The processing unit of claim 1, wherein an instruction is removed from the issue buffer after it is issued.

3. The processing unit of claim 2, wherein the issue buffer marks a space as empty after an instruction has been issued from the issue buffer.

4. The processing unit of claim 1, wherein the dependence checker circuit is further configured to mark and/or detect any read-after-write (RAW), write-after-read (WAR), or write-after-write (WAW) hazards of each instruction with instructions currently in the issue buffer.

5. The processing unit of claim 1, wherein the processing unit is a graphics processing unit (GPU).

6. The processing unit of claim 1, wherein the processing unit is configured to respect all register dependencies.

7. The processing unit of claim 1, wherein the processing unit is configured to issue all memory instructions in order with respect to each other.

8. The processing unit of claim 1, wherein the processing unit is configured to operate such that load instructions can be reordered against other load instructions but cannot be reordered against store instructions.

9. The processing unit of claim 1, wherein the processing unit is configured to operate such that store instructions are not reordered against any load or store instruction.

10. The processing unit of claim 1, wherein the processing unit is configured to consider structural hazards when selecting instructions for out-of-order issue.

11. The processing unit of claim 1, wherein the front-end further comprises an instruction buffer, the instruction buffer is configured to:

receive instructions and send a received instruction to the dependence checker circuit and the issue buffer when the issue buffer requests a new instruction.

12. The processing unit of claim 11, wherein new instructions are fetched only when the instruction buffer is empty.

13. The processing unit of claim 1, further comprising at least one warp scheduler configured to select at least one warp from its assigned warps and issuing one or more instructions from that warp.

14. The processing unit of claim 13, wherein the warp scheduler is configured to use a scheduling policy that selects one or more instructions from one or more warps with no structural hazards.

15. The processing unit of claim 13, wherein the processing unit utilizes the out-of-order scheduler and separate warp scheduler.

16. The processing unit of claim 15, wherein the out-of-order scheduler looks at one or more warps in each cycle to select one or more instructions which are ready for out-of-order issue.

17. The processing unit of claim 16, wherein the warp scheduler selects one or more of the ready instructions from one or more warps and issues the selected one or more ready instructions.

18. The processing unit of claim 1, wherein the out-of-order scheduler knows the instruction has no dependencies by means of a scoreboard.

19. The processing unit of claim 18, wherein, after issuing an instruction, a single instruction, multiple threads (SIMT) stack and/or a scoreboard (SB) is/are updated.

20. The processing unit of claim 1, wherein the out-of-order scheduler knows an instruction of the one or more instructions has no dependencies by means of an instruction encoding.

21. The processing unit of claim 1, wherein the processing unit is configured to select a warp for dependence checking if there was a writeback to the warp and/or the warp does not have any valid entries in an instruction table.

22. The processing unit of claim 1, wherein the processing unit maintains a Warp-WriteBack (WWb) bit-vector and an Instruction Table Empty (ITE) bit vector where each bit corresponds to a warp.

23. The processing unit of claim 22, wherein, when a warp has a write-back, the corresponding bit in the WWb is set.

24. The processing unit of claim 22, wherein, when a warp does not have any entries in the ITE, the corresponding ITE bit is set to one.

25. The processing unit of claim 22, wherein, in a cycle, the processing unit selects warps whose WWb bit is set over warps whose ITE bit is set.

26. The processing unit of claim 22, wherein after dependence checking for a warp, the WWb bit corresponding to the warp is unset.

27. The processing unit of claim 22, wherein when independent instructions are found and placed in the ITE, the ITE bit corresponding to the warp is unset.

28. The processing unit of claim 22, wherein, when the ITE bit is set for a warp, the warp is skipped for consideration by a warp scheduler in that cycle.

29. A processing unit, comprising: a front-end including:

an issue buffer configured to receive instructions;

a dependence checker circuit configured to receive instructions and detect any read-after-write (RAW), write-after-read (WAR), or write-after-write (WAW) hazards of each instruction; and an out-of-order (OoO) scheduler operably coupled to the issue buffer and dependence checker circuit, the OoO scheduler configured to select one or more instructions from the issue buffer for later stages, wherein the processing unit maintains a Warp-Write-Back (WWb) bit-vector and an Instruction Table Empty (ITE) bit vector where each bit corresponds to a warp.

* * * * *